(12) United States Patent
Kang et al.

(10) Patent No.: US 9,926,461 B2
(45) Date of Patent: *Mar. 27, 2018

(54) HARD COATING FILM

(71) Applicant: LG CHEM, LTD., Seoul (KR)

(72) Inventors: Joon Koo Kang, Daejeon (KR); Yeong Rae Chang, Daejeon (KR); Jae Hoon Shim, Daejeon (KR); Sung Don Hong, Daejeon (KR); Seung Jung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 439 days.

This patent is subject to a terminal disclaimer.

(21) Appl. No.: 14/404,280

(22) PCT Filed: May 31, 2013

(86) PCT No.: PCT/KR2013/004798
§ 371 (c)(1),
(2) Date: Nov. 26, 2014

(87) PCT Pub. No.: WO2013/180506
PCT Pub. Date: Dec. 5, 2013

(65) Prior Publication Data
US 2015/0166818 A1 Jun. 18, 2015

(30) Foreign Application Priority Data

| May 31, 2012 | (KR) | 10-2012-0058634 |
| May 31, 2012 | (KR) | 10-2012-0058635 |
| May 31, 2012 | (KR) | 10-2012-0058636 |
| May 31, 2012 | (KR) | 10-2012-0058637 |
| Aug. 27, 2012 | (KR) | 10-2012-0093689 |
| May 30, 2013 | (KR) | 10-2013-0062095 |

(51) Int. Cl.
*C09D 133/14* (2006.01)
*C09D 133/06* (2006.01)
*C08K 3/22* (2006.01)
*C08K 3/36* (2006.01)

(52) U.S. Cl.
CPC .............. *C09D 133/14* (2013.01); *C08K 3/22* (2013.01); *C09D 133/06* (2013.01); *C08K 3/36* (2013.01); *C08K 2003/2227* (2013.01); *C08K 2003/2237* (2013.01); *C08K 2003/2244* (2013.01); *C08K 2201/011* (2013.01); *C08L 2312/06* (2013.01); *Y10T 428/2495* (2015.01); *Y10T 428/259* (2015.01); *Y10T 428/269* (2015.01)

(58) Field of Classification Search
CPC .... C08K 2003/2227; C08K 2003/2237; C08K 2003/2244; C08K 2201/011; C08K 3/22; C08K 3/36; C08L 2312/06; C09D 133/06; C09D 133/14; Y10T 428/2495; Y10T 428/259; Y10T 428/269
See application file for complete search history.

(56) References Cited

U.S. PATENT DOCUMENTS

| 4,902,578 A | 2/1990 | Kerr, III |
| 6,245,833 B1 | 6/2001 | Kang et al. |
| 6,489,015 B1 | 12/2002 | Tsuchiya et al. |
| 7,622,055 B2 | 11/2009 | Nakano et al. |
| 2003/0008162 A1 | 1/2003 | Oya et al. |
| 2004/0081831 A1 | 4/2004 | Shoshi et al. |
| 2004/0135159 A1 | 7/2004 | Siegel |
| 2005/0136252 A1 | 6/2005 | Chisholm et al. |
| 2005/0136273 A1 | 6/2005 | Hashimoto et al. |
| 2006/0134400 A1 | 6/2006 | Takada et al. |
| 2006/0234035 A1 | 10/2006 | Wang et al. |
| 2006/0286383 A1 | 12/2006 | Gilmer |
| 2007/0178297 A1 | 8/2007 | Takada et al. |
| 2007/0231566 A1 | 10/2007 | Yoneyama et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0218666 A1 | 9/2008 | Toyooka |
| 2008/0257216 A1 | 10/2008 | Ravyst |
| 2008/0311351 A1 | 12/2008 | Hsu et al. |
| 2009/0169896 A1 | 7/2009 | Sohn et al. |
| 2009/0214871 A1 | 8/2009 | Fukuda et al. |
| 2009/0301561 A1 | 12/2009 | Wang et al. |
| 2010/0084037 A1 | 4/2010 | Ericsson et al. |
| 2010/0124631 A1 | 5/2010 | Horio et al. |
| 2010/0124656 A1 | 5/2010 | Horio et al. |
| 2010/0167068 A1 | 7/2010 | Horio |
| 2011/0050623 A1 | 3/2011 | Lee et al. |
| 2011/0124823 A1 | 5/2011 | Hayashi et al. |
| 2012/0019766 A1 | 1/2012 | Oki et al. |
| 2012/0034450 A1 | 2/2012 | Morita et al. |
| 2012/0128890 A1 | 5/2012 | Mirchev |

(Continued)

FOREIGN PATENT DOCUMENTS

| CN | 1558824 A | 12/2004 |
| CN | 1611968 A | 5/2005 |
| CN | 1286640 C | 11/2006 |
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |

(Continued)

OTHER PUBLICATIONS

Extended European Search Report dated Dec. 17, 2015, issued in European Patent Application No. 13797819.3, 12 pages.

(Continued)

*Primary Examiner* — Lawrence Ferguson
(74) *Attorney, Agent, or Firm* — Rothwell, Figg, Ernst & Manbeck, P.C.

(57) ABSTRACT

The present invention provides a hard coating film having high hardness and excellent properties. The hard coating film has high hardness and is not easily curled.

21 Claims, No Drawings

(56) References Cited

U.S. PATENT DOCUMENTS

| | | | |
|---|---|---|---|
| 2014/0079937 A1 | 3/2014 | Jung et al. | |
| 2015/0299507 A1 | 10/2015 | Kang et al. | |

FOREIGN PATENT DOCUMENTS

| | | |
|---|---|---|
| EP | 1162246 A1 | 12/2001 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 10-036540 A | 2/1998 |
| JP | H11-333370 A | 12/1999 |
| JP | 2000-015734 A | 1/2000 |
| JP | 2000-071392 A | 3/2000 |
| JP | 2000-103887 A | 4/2000 |
| JP | 2000-214791 A | 8/2000 |
| JP | 2000-286179 A | 10/2000 |
| JP | 2000-293895 A | 10/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-343119 A | 12/2005 |
| JP | 2006-051781 A | 2/2006 |
| JP | 2007-145965 A | 6/2007 |
| JP | 2007-262281 A | 10/2007 |
| JP | 2007-313872 A | 12/2007 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008-138165 A | 6/2008 |
| JP | 2008-150484 A | 7/2008 |
| JP | 2008-156387 A | 7/2008 |
| JP | 2008-165041 A | 7/2008 |
| JP | 2008-310286 A | 12/2008 |
| JP | 2009-025808 A | 2/2009 |
| JP | 2009-204725 A | 9/2009 |
| JP | 2009-204727 A | 9/2009 |
| JP | 2009-241458 A | 10/2009 |
| JP | 2009-255565 A | 11/2009 |
| JP | 2010-001431 A | 1/2010 |
| JP | 2010-017991 A | 1/2010 |
| JP | 2010-023507 A | 2/2010 |
| JP | 2010-024449 A | 2/2010 |
| JP | 2010-024450 A | 2/2010 |
| JP | 2010-052334 A | 3/2010 |
| JP | 2010-053231 A | 3/2010 |
| JP | 2010-085985 A | 4/2010 |
| JP | 2010-121013 A | 6/2010 |
| JP | 4496424 B2 | 7/2010 |
| JP | 2010-173234 A | 8/2010 |
| JP | 2010-284910 A | 12/2010 |
| JP | 2011-022456 A | 2/2011 |
| JP | 2011-031457 A | 2/2011 |
| JP | 2011-031527 A | 2/2011 |
| JP | 2011-504828 A | 2/2011 |
| JP | 2011-505452 A | 2/2011 |
| JP | 2011-046917 A | 3/2011 |
| JP | 2011-075705 A | 4/2011 |
| JP | 2011-093290 A | 5/2011 |
| JP | 2011-126160 A | 6/2011 |
| JP | 2011-126164 A | 6/2011 |
| JP | 2011-126165 A | 6/2011 |
| JP | 2011-145593 A | 7/2011 |
| JP | 2011-148181 A | 8/2011 |
| JP | 2011-148301 A | 8/2011 |
| JP | 2011-523370 A | 8/2011 |
| JP | 2011-178910 A | 9/2011 |
| JP | 2011-183561 A | 9/2011 |
| JP | 2011-201087 A | 10/2011 |
| JP | 2011-225846 A | 11/2011 |
| JP | 2011-246548 A | 12/2011 |
| JP | 2012-027190 A | 2/2012 |
| JP | 2012-027401 A | 2/2012 |
| JP | 2012-051118 A | 3/2012 |
| JP | 2012-063577 A | 3/2012 |
| JP | 2012-066477 A | 4/2012 |
| JP | 2012-072235 A | 4/2012 |
| JP | 4911474 B2 | 4/2012 |
| JP | 2012-518713 A | 8/2012 |
| JP | 2012-206262 A | 10/2012 |
| JP | 2013-095108 A | 5/2013 |
| KR | 10-1998-0020031 A | 3/1999 |
| KR | 10-1999-0072670 A | 9/1999 |
| KR | 10-2000-0021805 A | 4/2000 |
| KR | 10-2000-0021806 A | 4/2000 |
| KR | 10-2002-0008267 A | 1/2002 |
| KR | 10-0867338 B1 | 9/2002 |
| KR | 10-2004-0037081 A | 5/2004 |
| KR | 10-2004-0076422 A | 9/2004 |
| KR | 10-2004-0083916 A | 10/2004 |
| KR | 10-2004-0097189 A | 11/2004 |
| KR | 10-2006-0009194 A | 1/2006 |
| KR | 10-2007-0039742 A | 4/2007 |
| KR | 10-0730414 B1 | 6/2007 |
| KR | 10-0735894 B1 | 6/2007 |
| KR | 10-2007-0098560 A | 10/2007 |
| KR | 10-2007-0111352 A | 11/2007 |
| KR | 10-2008-0005839 A | 1/2008 |
| KR | 10-2008-0055698 A | 6/2008 |
| KR | 10-0852562 B1 | 8/2008 |
| KR | 10-2008-0109658 A | 12/2008 |
| KR | 10-2009-0020106 A | 2/2009 |
| KR | 10-0884079 B1 | 2/2009 |
| KR | 10-2009-0044089 A | 5/2009 |
| KR | 10-2009-0061821 A | 6/2009 |
| KR | 10-2009-0063182 A | 6/2009 |
| KR | 10-0905683 B1 | 6/2009 |
| KR | 10-2009-0073668 A | 7/2009 |
| KR | 10-0926220 B1 | 11/2009 |
| KR | 10-2010-0019661 A | 2/2010 |
| KR | 10-0945063 B1 | 2/2010 |
| KR | 10-2010-0026012 A | 3/2010 |
| KR | 10-2010-0026014 A | 3/2010 |
| KR | 10-2010-0037519 A | 4/2010 |
| KR | 10-2010-0041992 A | 4/2010 |
| KR | 10-2010-0045997 A | 5/2010 |
| KR | 10-2010-0055160 A | 5/2010 |
| KR | 10-2010-0077798 A | 7/2010 |
| KR | 10-2010-0098320 A | 9/2010 |
| KR | 10-2010-0121281 A | 11/2010 |
| KR | 10-2010-0124477 A | 11/2010 |
| KR | 10-2010-0129512 A | 12/2010 |
| KR | 10-2010-0130367 A | 12/2010 |
| KR | 10-2010-0132786 A | 12/2010 |
| KR | 10-2011-0034324 A | 4/2011 |
| KR | 10-2011-0037622 A | 4/2011 |
| KR | 10-2011-0047596 A | 5/2011 |
| KR | 10-2011-0058743 A | 6/2011 |
| KR | 10-2011-0071480 A | 6/2011 |
| KR | 10-1058395 B1 | 8/2011 |
| KR | 10-2011-0103885 A | 9/2011 |
| KR | 10-2011-0104663 A | 9/2011 |
| KR | 10-2011-0130142 A | 12/2011 |
| KR | 10-1093721 B1 | 12/2011 |
| KR | 10-2012-0002366 A | 1/2012 |
| KR | 10-1127952 B1 | 3/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2007-081186 A1 | 7/2007 |

(56) References Cited

FOREIGN PATENT DOCUMENTS

| WO | 2007-121102 A1 | 10/2007 |
|---|---|---|
| WO | 2008-098872 A1 | 8/2008 |
| WO | 2009-050957 A1 | 4/2009 |
| WO | 2010-035764 A1 | 4/2010 |
| WO | 2011-013611 A | 2/2011 |
| WO | 2011/105532 A1 | 9/2011 |
| WO | 2012-026475 A1 | 3/2012 |
| WO | 2012/060145 A1 | 5/2012 |
| WO | 2012-066743 A1 | 5/2012 |
| WO | 2013/105656 A1 | 7/2013 |

OTHER PUBLICATIONS

Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.
Extended European Search Report dated Mar. 15, 2016, issued in European Patent Application No. 13830681.6, 10 pages.
Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.
Search Report issued in International Application No. PCT/KR2013/004809 dated Aug. 12, 2013, 5 pages.
Search Report issued in International Application No. PCT/KR2013/004804 dated Aug. 19, 2013, 5 pages.
Search Report issued in International Application No. PCT/KR2013/004805 dated Aug. 22, 2013, 5 pages.
Search Report issued in International Application No. PCT/KR2013/004798 dated Aug. 28, 2013, 6 pages.
Search Report issued in International Application No. PCT/KR2013/004807 dated Sep. 4, 2013, 7 pgs.
Search Report issued in International Application No. PCT/KR2013/004812, dated Sep. 12, 2013, 6 pages.
Shin-Nakamura Chemical Co., Ltd.; (2009); Product list; Retrieved from http://www.shin-nakamura.com/products/monomer-oligomer-07.html (2 pages).
Ciba TINUVIN 900 Light Stabilizer, Ciba Specialty Chemicals, 1997, pp. 1-3.

HARD COATING FILM

CROSS REFERENCE TO RELATED APPLICATIONS

This application is a 35 U.S.C. § 371 National Phase Entry Application from PCT/KR2013/004798, filed May 31, 2013, and designating the U. S., which claims priority under 35 U.S.C. § 119 to Korean Patent Application No. 10-2012-0058634,filed on May 31, 2012, Korean Patent Application No. 10-2012-0058635, filed on May 31, 2012, Korean Patent Application No. 10-2012-0058636, filed on May 31, 2012, Korean Patent Application No. 10-2012-0058637, filed on May 31, 2012, Korean Patent Application No. 10-2012-0093689 filed on Aug. 27, 2012, and to Korean Patent Application No. 10-2013-0062095, filed on May 30, 2013, which are incorporated herein by reference in their entireties.

TECHNICAL FIELD

The present invention relates to a hard coating film. More particularly, the present invention relates to a hard coating film having high hardness and excellent properties.

This application claims the benefits of Korean Patent Application Nos. 10-2012-0058634, filed on May 31, 2012, 10-2012-0058635, filed on May 31, 2012, 10-2012-0058636, filed on May 31, 2012, 10-2012-0058637, filed on May 31, 2012, 10-2012-0093689, filed on Aug. 27, 2012, and 10-2013-0062095, filed on May 30, 2013. The entire disclosures of the prior applications are hereby incorporated by references herein in its entirety into this application.

BACKGROUND ART

Recently, with the advance of mobile appliances such as smart phones, tablet PCs and the like, substrates for displays have been required to become thin or slim. Display windows or front panels of such mobile appliances are generally made of glass or reinforced glass which is a material having excellent mechanical properties. However, glass materials suffer from the disadvantage of making the mobile appliances heavy due to their own weight and being apt to be broken by external impacts.

As an alternative to glass, plastic resin films have been researched. A plastic resin film is suitable for the trend of pursuing lighter and slimmer mobile appliances because it is lightweight and does not easily break. Particularly, a film with high hardness and wear resistance is required. In this regard, it is proposed to have a structure in which the substrate is coated with a hard coating layer.

As a method of improving the surface hardness of a hard coating layer, a method of increasing the thickness of the hard coating layer may be considered. In order to ensure the surface hardness of the hard coating layer to such a degree that glass can be replaced by the hard coating layer, it is necessary to adjust the thickness of the hard coating layer. However, as the thickness of the hard coating layer increases, the surface hardness thereof may become higher, whereas the hard coating layer may be wrinkled or curled due to the curing shrinkage thereof and may be easily cracked or exfoliated. Therefore, it is not easy to put the hard coating layer to practical use.

Recently, there haven been proposed several methods of increasing the hardness of a hard coating film and solving the problem of the hard coating film being cracked or curled by the curing shrinkage thereof.

Korean Patent Application Publication No. 2010-0041992 discloses a hard coating film composition, free of monomers, using a binder resin including ultraviolet-curable polyurethane acrylate oligomers. However, this hard coating film has a pencil hardness of about 3H, which is not sufficient to alternate glass panels for displays.

DISCLOSURE

Technical Problem

Accordingly, the present invention has been devised to solve the above-mentioned problems, and an object of the present invention is to provide a hard coating film having high hardness, which is not curled, warped or cracked.

Technical Solution

In order to accomplish the above object, an aspect of the present invention provides a hard coating film, including: a supporting substrate; a first hard coating layer which is formed on one side of the supporting substrate and which includes 40 to 60 parts by weight of a first photocurable crosslinked copolymer and 40 to 60 parts by weight of first inorganic particles dispersed in the first photocurable crosslinked copolymer based on 100 parts by weight of the first hard coating layer; and a second hard coating layer which is formed on the other side of the supporting substrate and which includes more than 60 to less than 100 parts by weight of a second photocurable crosslinked copolymer and more than 0 to less than 40 parts by weight of second inorganic particles dispersed in the second photocurable crosslinked copolymer based on 100 parts by weight of the second hard coating layer.

Advantageous Effects

As described above, the hard coating film of the present invention exhibits excellent properties in terms of hardness, scratch resistance, and transparency. In addition, it is of high workability and thus is much less prone to curling and cracking. Therefore, this hard coating film can be usefully applied to front panels or display panels of mobile appliances, display devices, instruments and the like.

BEST MODE FOR CARRYING OUT THE INVENTION

In accordance with an aspect thereof, the present invention provides a hard coating film including: a supporting substrate; a first hard coating layer which is formed on one side of the supporting substrate and which includes 40 to 60 parts by weight of a first photocurable crosslinked copolymer and 40 to 60 parts by weight of first inorganic particles dispersed in the first photocurable crosslinked copolymer based on 100 parts by weight of the first hard coating layer; and a second hard coating layer which is formed on the other side of the supporting substrate and which includes more than 60 to less than 100 parts by weight of a second photocurable crosslinked copolymer and more than 0 to less than 40 parts by weight of second inorganic particles dispersed in the second photocurable crosslinked copolymer based on 100 parts by weight of the second hard coating layer.

In the present invention, the terms "first", "second" and the like are used to describe various constituents, only for the purpose of differentiating one constituent from another.

Further, the terms used in the present specification are used only to illustrate the present invention, and do not intend to limit the present invention. The singular number includes the plural number as long as they are apparently different from each other in context. In the present specification, the terms "include", "comprise", "have" and the like designate the existence of features, steps, constituents and combinations thereof, and must be understood that existence or addition of one or more other features, steps, constituents and combinations thereof is not previously excluded.

Further, in the present invention, when it is mentioned that each constituent is formed "on", "over" or "above" each constituent, it means that each constituent is directly formed on each constituent or that another constituent is additionally formed between layers, on an object or on a substrate.

Since the present invention may be modified in various forms, preferred embodiments of the present invention will be described in detail. Although these embodiments have been disclosed for illustrative purposes, it will be appreciated that the present invention is not limited thereto, and those skilled in the art will appreciate that various modifications, additions and substitutions are possible, without departing from the scope and spirit of the invention.

Hereinafter, preferred embodiments of the present invention will be described in detail.

A hard coating film according to an embodiment of the present invention includes: a supporting substrate; a first hard coating layer which is formed on one side of the supporting substrate and which includes 40 to 60 parts by weight of a first photocurable crosslinked copolymer and 40 to 60 parts by weight of first inorganic particles dispersed in the first photocurable crosslinked copolymer based on 100 parts by weight of the first hard coating layer; and a second hard coating layer which is formed on the other side of the supporting substrate and which includes more than 60 to less than 100 parts by weight of a second photocurable crosslinked copolymer and more than 0 to less than 40 parts by weight of second inorganic particles dispersed in the second photocurable crosslinked copolymer based on 100 parts by weight of the second hard coating layer.

In the hard coating film of the present invention, so long as it is transparent, any plastic resin, whether capable of being stretched or not, may be used for the supporting substrate which the first and the second hard coating layers will be formed on, without limitations imposed thereto. According to an embodiment of the present invention, the supporting substrate may include polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multilayered substrate made of polyethyleneterephthalate (PET) or may be a multilayered substrate formed by the coextrusion of polymethylmethacrylate (PMMA) and polycarbonate (PC).

Further, according to an embodiment of the present invention, the supporting substrate may be a substrate including a copolymer of polymethylmethacrylate (PMMA) and polycarbonate (PC).

The thickness of the supporting substrate may be, but is not limited to, about 30 to about 1,200 μm or about 50 to about 800 μm.

The hard coating film of the present invention includes first and second hard coating layers formed on both sides of the supporting substrate.

Further, according to an embodiment of the present invention, the thickness ratio of the supporting substrate to the first and second hard coating layers may be about 1:0.5 to about 1:2, or about 1:0.5 to about 1:1.5. When the thickness ratio thereof is present in the above range, a hard coating film, which exhibits high hardness and which is not easily curled or cracked, may be formed.

In the hard coating film of the present invention, the first hard coating layer includes 40 to 60 parts by weight of a first photocurable crosslinked copolymer and 40 to 60 parts by weight of first inorganic particles dispersed in the first photocurable crosslinked copolymer, based on 100 parts by weight of the first hard coating layer. Further, according to an embodiment of the present invention, the first hard coating layer may include 50 to 60 parts by weight of a first photocurable crosslinked copolymer and 40 to 50 parts by weight of first inorganic particles dispersed in the first photocurable crosslinked copolymer, based on 100 parts by weight of the first hard coating layer. Since the first hard coating layer includes the first photocurable crosslinked copolymer and the first inorganic particles in the above amounts, a hard coating film having excellent physical properties can be formed.

According to an embodiment of the present invention, each of the first and second photocurable crosslinked copolymers may be the same or different from one another and independently a copolymer of tri- to hexa-functional acrylate-based monomers.

In the present specification, the term "acrylate-based" is intended to encompass acrylate, methacrylate, and derivatives thereof with various substituents.

Examples of the tri- to hexa-functional acrylate-based monomers may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. The tri- to hexa-functional acrylate-based monomers may be used independently or in a combination thereof.

According to an embodiment of the present invention, the first photocurable crosslinked copolymer may be a copolymer in which the tri- to hexa-functional acrylate-based monomers are crosslink-polymerized with each other.

According to another embodiment of the present invention, the first photocurable crosslinked copolymer may be the same or different from one another and independently a copolymer in which the tri- to hexa-functional acrylate-based monomers are crosslink-polymerized with mono- to di-functional acrylate-based monomers.

Examples of the mono- to di-functional acrylate-based monomers may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. The mono- to di-functional acrylate-based monomers may also be used independently or in a combination thereof.

When the first photocurable crosslinked copolymer is a copolymer in which mono- to di-functional acrylate-based monomers are crosslink-polymerized with tri- to hexa-functional acrylate-based monomers, the content ratio of the mono- to di-functional acrylate-based monomers to the trito hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, or about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

According to the present invention, each of the first and second photocurable crosslinked copolymers may be a copolymer in which tri- to hexa-functional acrylate-based monomers are crosslink-polymerized with a photocurable elastic polymer.

In the present specification, the photocurable elastic polymer refers to a polymer material which is elastic and contains a functional group that can be crosslink-polymerized by UV irradiation.

According to an embodiment of the present invention, the photocurable elastic polymer may have an elongation of about 15% or more, for example, about 15 to about 200%, about 20 to about 200% or about 20 to about 150%, as measured according to ASTM D638.

When each of the first and second photocurable crosslinked copolymers further includes a photocurable elastic polymer, the photocurable elastic polymer is crosslink-polymerized with the tri- to hexa-functional acrylate-based monomers to form a hard coating layer, which is improved in flexibility and impact resistance.

In this case, the content ratio of the photocurable elastic polymer to the tri- to hexa-functional acrylate-based monomer is not particularly limited. However, according to an embodiment of the present invention, the photocurable elastic polymer and the tri- to hexa-functional acrylate-based monomer may be included such that the weight ratio thereof may be about 5:95 to about 20:80. When the photocurable elastic polymer and the tri- to hexa-functional acrylate-based monomer are included at the above weight ratio, the hard coating layer may be imparted with high hardness and flexibility without deteriorating other physical properties such as curl characteristics, light resistance and the like, and, particularly, it is possible to prevent the hard coating layer from being damaged by external impact, thus assuring excellent impact resistance.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate-based polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

The urethane acrylate-based polymer retains urethane bonds and has excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include polyrotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

In this case, the cyclic moiety (macrocycle) may be used without limitation as long as it has a size to such degree that it surrounds the thread moiety. The cyclic moiety (macrocycle) may include a functional group such as a hydroxide group, an amino group, a carboxyl group, a thiol group, an aldehyde group or the like, which can react with other polymers or compounds. Specific examples of the cyclic moiety (macrocycle) may include α-cyclodextrin, β-cyclodextrin, γ-cyclodextrin and mixtures thereof.

Further, the thread moiety may be used without limitation as long as it is generally linear in shape with a predetermined weight or greater. Preferably, a polyalkylene compound or a polylactone compound may be used in the thread moiety. Specifically, a polyoxyalkylene compound including an oxyalkylene repetitive unit of 1 to 8 carbon atoms or a polylactone compound including a lactone repetitive unit of 3 to 10 carbon atoms may be used in the thread moiety.

Meanwhile, the stopper may be appropriately adjusted depending on the characteristics of the rotaxane compound to be prepared. For example, the stopper may be at least one selected from the group consisting of a dinitrophenyl group, a cyclodextrin group, an adamantane group, a trityl group, a fluorescein group and a pyrene group.

Since the polyrotaxane has excellent scratch resistance, it can exhibit self-recovery ability when it is externally damaged and scratched.

Further, in the hard coating film of the present invention, the first hard coating layer includes first inorganic particles dispersed in the first photocurable crosslinked copolymer.

According to an embodiment of the present invention, as the first inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the first inorganic particles.

The first hard coating layer includes the first inorganic particles in a high content, thus further improving the hardness of a hard coating film.

Meanwhile, the first hard coating layer may further include commonly-used additives such as a surfactant, a yellowing inhibitor, a leveling agent, an antifouling agent and the like in addition to the above-mentioned first photocurable crosslinked copolymer and the first inorganic particles. Here, the content of the additive is not particularly limited because the content thereof may be variously adjusted as long as the physical properties of the hard coating film are not deteriorated. For example, the additive may be included in an amount of about 0.1 to about 10 parts by weight based on 100 parts by weight of the first photocurable crosslinked copolymer.

According to an embodiment of the present invention, for example, the first hard coating layer may include a surfactant as an additive. The surfactant may be a mono- to di-functional fluorine-based acrylate, a fluorine-based surfactant or a silicon-based surfactant. In this case, the surfactant may be included in the form of it being dispersed in or crosslinked with the first photocurable crosslinked copolymer.

Further, the first hard coating layer may include a yellowing inhibitor as the additive. The yellowing inhibitor may be a benzophenone compound or a benzotriazole compound.

The first hard coating layer may be formed by photocuring a first hard coating composition including a binder containing the tri- to a hexa-functional acrylate-based monomer, first inorganic particles, a photoinitiator and an additive.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, examples of commercially available photoinitiators may include Irgacure 184, Irgacure 500, Irgacure 651, Irgacure 369, Irgacure 907, Darocur 1173Darocur MBF, Irgacure 819, Darocur TPO, Irgacure 907, Esacure KIP 100F, and the like. These photoinitiators may be used independently or in a mixture thereof.

Further, in order to adjust the viscosity and fluidity of the first hard coating composition and improve the coatability of the first hard coating composition to the supporting substrate, the first hard coating layer may be formed by adding an organic solvent to the first hard coating composition and then applying the organic solvent-added first hard coating composition onto the supporting substrate.

Examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

In the hard coating film of the present invention, when the organic solvent-added first hard coating composition is applied onto the supporting substrate, the organic solvent may be included such that the weight ratio of solid content: the organic solvent is about 70:30 to about 99:1, the solid content including the binder, first inorganic particles, photoinitiator and other additives. As described above, when the solid content thereof is high, a high-viscosity composition is obtained, and thus thick coating can be performed, thereby forming a thick hard coating layer having a thickness of 50 μm or more.

According to an embodiment of the present invention, the first hard coating composition including the above-mentioned components is applied onto one side of the supporting substrate, and then photocured to form a first hard coating layer.

The completely-cured first hard coating layer may have a thickness of about 50 μm or more, for example, about 50 to about 150 μm, or about 70 to about 100 μm. According to the present invention, there may be a high-hardness hard coating film, which is not curled or cracked although it includes the above-mentioned first hard coating layer.

The hard coating film of the present invention includes a second hard coating layer which is formed on the other side of the supporting substrate and which includes more than 60 to less than 100 parts by weight of a second photocurable crosslinked copolymer and more than 0 to less than 40 parts by weight of second inorganic particles dispersed in the second photocurable crosslinked copolymer based on 100 parts by weight of the second hard coating layer. According to an embodiment of the present invention, the second hard coating layer may include 70 to 90 parts by weight of a second photocurable crosslinked copolymer and 10 to 30 parts by weight of second inorganic particles dispersed in the second photocurable crosslinked copolymer based on 100 parts by weight of the second hard coating layer. Since the second hard coating layer includes the second photocurable crosslinked copolymer and the second inorganic particles in the above amounts, a hard coating film having excellent physical properties can be formed.

Detailed description of the tri- to hexa-functional acrylate-based monomer is the same as that in the first hard coating layer. The tri- to hexa-functional acrylate-based monomer included in the second hard coating layer may be the same as or different from that included in the first hard coating layer.

According to an embodiment of the present invention, the second photocurable crosslinked copolymer may be a copolymer in which tri- to hexa-functional acrylate-based monomers are crosslink-polymerized with each other.

According to another embodiment of the present invention, the second photocurable crosslinked copolymer may be a copolymer in which tri- to hexa-functional acrylate-based monomers are crosslink-polymerized with mono- to di-functional acrylate-based monomers.

Detailed description of the mono- to di-functional acrylate-based monomer is the same as that in the first hard coating layer. The mono- to di-functional acrylate-based monomer included in the second hard coating layer may be the same as or different from that included in the first hard coating layer.

When the second photocurable crosslinked copolymer is a copolymer in which mono- to di-functional acrylate-based monomers are crosslink-polymerized with tri- to hexa-functional acrylate-based monomers, the content ratio of the mono- to di-functional acrylate-based monomers to the tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, about 10:90 to about 50:50, or about 20:80 to about 40:60.

According to another embodiment of the present invention, the second photocurable crosslinked copolymer may be a copolymer in which tri- to hexa-functional acrylate-based monomers are crosslink-polymerized with a photocuarble elastic polymer.

Detailed description of the photocuarble elastic polymer is the same as that in the first hard coating layer. The photocuarble elastic polymer included in the second hard coating layer may be the same as or different from that included in the first hard coating layer.

Further, in the hard coating film of the present invention, the second hard coating layer includes second inorganic particles dispersed in the second photocurable crosslinked copolymer.

According to an embodiment of the present invention, as the second inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the second inorganic particles.

The second hard coating layer includes the second inorganic particles, thus further improving the hardness of a hard coating film. Further, the second hard coating layer includes second inorganic particles in a relatively small amount compared to the first hard coating layer. Therefore, the second hard coating layer sets off the curl caused by the curing shrinkage of the first hard coating layer in a direction opposite thereto, thus providing a hard coating film having high hardness and minimizing the formation of curl.

Meanwhile, the second hard coating layer may further include commonly-used additives such as a surfactant, a yellowing inhibitor, a leveling agent, an antifouling agent and the like in addition to the above-mentioned second photocurable crosslinked copolymer and the second inorganic particles. Detailed description of these additives is the same as that in the first hard coating layer.

The second hard coating layer may be formed by photocuring a second hard coating composition including a binder containing the tri- to hexa-functional acrylate-based monomer, second inorganic particles, a photoinitiator and an additive.

Detailed description of the photoinitiator is the same as that in the first hard coating layer. The photoinitiator included in the second hard coating layer may be the same as or different from that used in the first hard coating layer.

Further, in order to adjust the viscosity and fluidity of the second hard coating composition and improve the coatability of the second hard coating composition to the supporting substrate, the second hard coating layer may be formed by adding an organic solvent to the second hard coating composition and then applying the organic solvent-added second hard coating composition onto the supporting substrate. Detailed description of the organic solvent is the same as that in the first hard coating layer. The organic solvent used in the second hard coating layer may be the same as or different from that used in the first hard coating layer.

In the hard coating film of the present invention, when the organic solvent-added second hard coating composition is applied onto the supporting substrate, the organic solvent may be included such that the weight ratio of the organic solvent to the solid content including the binder, second inorganic particles, photoinitiator and additive is about 70:30 to about 99:1. As described above, when the solid content thereof is high, a high-viscosity composition is obtained, and thus thick coating can be performed, thereby forming a thick hard coating layer having a thickness of 50 μm or more.

The second hard coating composition including the above-mentioned components is applied onto the other side of the supporting substrate, and then photocured to form a second hard coating layer.

The completely-cured second hard coating layer may have a thickness of about 50 μm or more, for example, about 50 to about 150 μm, or about 70 to about 100 μm. According to the present invention, there may be provided a high-hardness hard coating film, which is not curled or cracked although it includes the above-mentioned second hard coating layer.

In the step of photocuring the second hard coating composition, since ultraviolet is radiated to a side opposite to the side on which the first hard coating composition applied, the curls caused by the curing and contraction of the first hard coating layer in the first photocuring step are set off in a direction opposite thereto, thus obtaining a flat hard coating film. Therefore, an additional flattening procedure is not needed.

According to an embodiment of the present invention, the hard coating film of the present invention may be formed by a two-step process including the steps of: 1) applying a first hard coating composition onto one side of the supporting substrate and then photocuring the first hard coating composition; and 2) applying a second hard coating composition onto the other side of the supporting substrate and then photocuring the second hard coating composition.

In this case, the step 1) of photocuring the first hard coating composition may be conducted until a part of an acrylate-based monomer included in the first hard coating composition is crosslinked. The fact that a part of an acrylate-based monomer is crosslinked means that the acrylate-based monomer is partially crosslinked by less than 100% when the acrylate-based monomer is completely crosslinked by 100%. For example, according to an embodiment of the present invention, the step 1) of photocuring the first hard coating composition may be conducted until about 30 to about 60 mol % or about 40 to about 50 mol % of functional groups included in the acrylate-based monomer are crosslinked. Due to the partial photocuring of the first hard coating composition, the curing shrinkage of the first hard coating layer can be retarded.

The degree of crosslinkage of the acrylate-based monomer can be evaluated by measuring the number of moles of functional groups, that is, double bonds (C=C) remaining in the acrylate-based monomer using infrared (IR) after photocuring the first hard coating composition and then comparing it with the amount of functional groups included in the acrylate-based monomer before photocuring the first hard coating composition.

As described above, in the partially-photocured first hard coating layer in which the acrylate-based monomer is partially crosslinked, residual non-crosslinked acrylate-based monomer is photocured together with the second hard coating composition in the step 2) of applying the second hard coating composition and then photocuring the second hard coating composition, thereby forming first and second hard coating layers.

The hard coating film of the present invention can exhibit high hardness because thick hard coating layers are formed on both sides of a supporting substrate using hard coating compositions including a large amount of inorganic particles. Further, the hard coating film of the present invention can prevent curls or cracks occurring when thick hard coating layers are formed. Therefore, a hard coating film having high hardness and exhibiting excellent physical and optical characteristics without generating curls or cracks can be obtained.

According to an embodiment of the present invention, when the hard coating film is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less, or about 0.3 mm or less.

The hard coating film of the present invention can be usefully used in various fields because it has high hardness, scratch resistance, transparency, durability, light resistance, light transmittance and the like.

For example, the hard coating film of the present invention may have a pencil hardness of 7H or more, 8H or more or 9H or more under a load of 1 kg.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film of the present invention may have a light transmittance of 91.0% or more, or 92.0% or more, and a haze of 1.0% or less, 0.5% or less, or 0.4% or less.

Further, the hard coating film of the present invention may have an initial color b* value of 1.0 or less. Further, when the hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

As described above, the hard coating film of the present invention can be used in various fields. For example, the hard coating film of the present invention can be used in touch panels of mobile terminals, smart phones or tablet PCs and covers of displays or devices.

Hereinafter, the present invention will be described in more detail with reference to the following Examples. However, these Examples are set forth to illustrate the present invention, and the scope of the present invention is not limited thereto.

EXAMPLES

Preparation Example 1

Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether and 315 g of methyl ethyl ketone. Then, the mixture was reacted at 70° C. for 5 hours to obtain polyrotaxane in which polylactone with an acrylate moiety conjugated to the end thereof acted as the macrocycle while cyclodextrin was positioned as the stopper.

The weight average molecular weight of the obtained polyrotaxane was 600,000 g/mol, and the elongation thereof was 20%, as measured according to ASTM D638.

Example 1

1 g of hydroxyethylacrylate (HEA), 8 g of a silica-dipentaerythritolhexacrylate (DPHA) composite (silica 4 g, DPHA 4 g) dispersed with silica nanoparticles having a particle size of 20~30 nm in an amount of 50 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition.

1 g of hydroxyethylacrylate (HEA), 6 g of a silica-dipentaerythritolhexacrylate (DPHA) composite (silica 1.5 g, DPHA 4.5 g) dispersed with silica nanoparticles having a particle size of 20~30 nm in an amount of 25 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a second hard coating composition.

The first hard coating composition was applied on one side of a PET supporting substrate having a size of 15 cm×20 cm and a thickness of 188 μm. Then, the PET supporting substrate coated with the first hard coating composition was irradiated with ultraviolet having a wavelength of 280~350 nm using a black light fluorescent lamp to photocure the first hard coating composition.

The second hard coating composition was applied on the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of each of the first and second hard coating layers formed on both sides of the PET supporting substrate was 100 μm.

Example 2

A hard coating film was prepared in the same manner as in Example 1, except that, in the first hard coating composition, 8 g of a silica-dipentaerythritolhexacrylate (DPHA) composite (silica 4.8 g, DPHA 3.2 g) dispersed with silica nanoparticles having a particle size of 20~30 nm in an amount of 60 wt % was used instead of 8 g of a silica-dipentaerythritolhexacrylate (DPHA) composite (silica 4 g, DPHA 4 g) dispersed with silica nanoparticles having a particle size of 20~30 nm in an amount of 50 wt %.

Example 3

A hard coating film was prepared in the same manner as in Example 1, except that, in the first hard coating composition, 8 g of a silica-trimethylolpropanetriacylate (TMPTA) composite (silica 4 g, TMPTA 4 g) dispersed with silica nanoparticles having a particle size of 20~30 nm in an amount of 50 wt % was used instead of 8 g of a silica-dipentaerythritolhexacrylate (DPHA) composite (silica 4 g, DPHA 4 g) dispersed with silica nanoparticles having a particle size of 20~30 nm in an amount of 50 wt %.

Example 4

A hard coating film was prepared in the same manner as in Example 1, except that, in the first hard coating composition, 8 g of a silica-trimethylolpropanetriacylate (TMPTA) composite (silica 4.8 g, TMPTA 3.2 g) dispersed with silica nanoparticles having a particle size of 20~30 nm in an amount of 60 wt % was used instead of 8 g of a silica-dipentaerythritolhexacrylate (DPHA) composite (silica 4 g, DPHA 4 g) dispersed with silica nanoparticles having a particle size of 20~30 nm in an amount of 50 wt %.

Example 5

A hard coating film was prepared in the same manner as in Example 1, except that, in the first hard coating composition, 1 g of polyrotaxane of Preparation Example 1 was used instead of 1 g of hydroxyethylacrylate (HEA), and that, in the second hard coating composition, 1 g of polyrotaxane of Preparation Example 1 was used instead of 1 g of hydroxyethylacrylate (HEA).

Example 6

A hard coating film was prepared in the same manner as in Example 1, except that, in the first hard coating composition, 1 g of a urethane acrylate-based polymer (brand name: UA340P, Shinnakamura Chemicals Corp., weight average molecular weight: 13,000 g/mol, elongation measured based on ASTM D638: 150%) was used, and that, in the second hard coating composition, 1 g of a urethane acrylate-based polymer (brand name: UA340P) was used instead of 1 g of hydroxyethylacrylate (HEA).

The components and contents of the first and second hard coating compositions of Examples 1 to 6 are summarized in Table 1 below.

TABLE 1

|  | First hard coating composition | | | Second hard coating composition | | |
| --- | --- | --- | --- | --- | --- | --- |
| No. | Acrylate monomer | Inorganic particle | Elastic polymer | Acrylate monomer | Inorganic particle | Elastic polymer |
| Ex. 1 | HEA 1 g, DPHA 4 g | 4 g | 0 | HEA 1 g, DPHA 4.5 g | 1.5 g | 0 |
| Ex. 2 | HEA 1 g, DPHA 3.2 g | 4.8 g | 0 | HEA 1 g, DPHA 4.5 g | 1.5 g | 0 |
| Ex. 3 | HEA 1 g, TMPTA 4 g | 4 g | 0 | HEA 1 g, DPHA 4.5 g | 1.5 g | 0 |
| Ex. 4 | HEA 1 g, TMPTA 3.2 g | 4.8 g | 0 | HEA 1 g, DPHA 4.5 g | 1.5 g | 0 |
| Ex. 5 | DPHA 4 g | 4 g | polyrotaxane 1 g | DPHA 4.5 g | 1.5 g | polyrotaxane 1 g |
| Ex. 6 | DPHA 4 g | 4 g | UA340P 1 g | DPHA 4.5 g | 1.5 g | UA340P 1 g |

Text Example

Measuring Method

1) Pencil Hardness

Pencil hardness was evaluated according to the Japanese Standard JIS K5400. In this regard, a pencil hardness meter was reciprocated three times on the first hard coating layer of each of the hard coating films under a load of 1.0 kg to determine the hardness at which no scratches were observed.

2) Scratch Resistance

After being loaded to a friction tester, a steel wool (#0000) was reciprocated 400 times on the first hard coating layer of each of the hard coating films under a load of 0.5 kg, and scratches thus formed were counted. Evaluation was made of the scratch resistance of the films by marking ○ for two or less scratches, Δ for two to less than five scratches, and × for five or more scratches.

3) Light Resistance

Differences in color b* value of the hard coating films were measured before and after exposure to UVB from UV lamp for 72 hours.

4) Transmittance and Haze

The transmittance and haze of the hard coating films were measured using a spectrophotometer (brand name: COH-400).

5) Curl Property to Temperature and Humidity

When each of the hard coating films was cut to a size of 10 cm×10 cm, stored in a chamber at a temperature of 85° C. and a humidity of 85% for 72 hours and then placed on a plane, the maximum distance at which each edge of the hard coating film was spaced apart the plane was measured.

6) Cylindrical Bending Test

Each of the hard coating films was wound on a cylindrical mandrel having a diameter of 3 cm, and then it was determined whether or not each of the hard coating film was cracked. IF each of the hard coating films was not cracked, it was evaluated as OK, and if it was cracked, it was evaluated as X.

The results of the physical properties measured in the hard coating films are summarized in Table 2 below.

TABLE 2

|  | Ex. 1 | Ex. 2 | Ex. 3 | Ex. 4 | Ex. 5 | Ex. 6 |
| --- | --- | --- | --- | --- | --- | --- |
| Pencil hardness | 9H | 8H | 9H | 8H | 8H | 8H |
| Scratch resistance | ○ | ○ | ○ | ○ | ○ | ○ |
| Light resistance | 0.25 | 0.22 | 0.18 | 0.15 | 0.17 | 0.15 |
| Transmittance | 92.4 | 92.5 | 92.3 | 92.5 | 92.0 | 92.1 |
| Haze | 0.2 | 0.4 | 0.3 | 0.4 | 0.4 | 0.3 |
| Bending test | OK | OK | OK | OK | OK | OK |
| Curl property | 0.3 mm | 0.2 mm | 0.4 mm | 0.2 mm | 0.1 mm | 0.2 mm |

As given in Table 2 above, it can be ascertained that all of the hard coating films of Examples 1 to 6 exhibit good physical properties.

The invention claimed is:

1. A hard coating film, comprising:
   a supporting substrate;
   a first hard coating layer which is formed on one side of the supporting substrate and which includes 40 to 60 parts by weight of a first photocurable crosslinked copolymer and 40 to 60 parts by weight of first inorganic particles dispersed in the first photocurable crosslinked copolymer based on 100 parts by weight of the first hard coating layer; and
   a second hard coating layer which is formed on the other side of the supporting substrate and which includes more than 60 to less than 100 parts by weight of a second photocurable crosslinked copolymer and more than 0 to less than 40 parts by weight of second inorganic particles dispersed in the second photocurable crosslinked copolymer based on 100 parts by weight of the second hard coating layer, wherein the hard coating film has a hardness property of a pencil hardness of 7H or more when evaluated under a load of 1 kg according to the Japanese Standard JIS K5400.

2. The hard coating film of claim 1, wherein the first and second photocurable crosslinked copolymers are the same or different from one another and independently a copolymer of tri- to hexa-functional acrylate-based monomers.

3. The hard coating film of claim 2, wherein the tri- to hexa-functional acrylate-based monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

4. The hard coating film of claim 1, wherein the first and second photocurable crosslinked copolymers are the same or different from one another and independently a copolymer of the tri- to hexa-functional acrylate-based monomer and a mono- to di-functional acrylate-based monomer.

5. The hard coating film of claim 4, wherein the mono- to di-functional acrylate-based monomer includes at least one selected from the group consisting of hydroxyethyl acrylate (HEA), hydroxyethyl methacrylate (HEMA), hexanediol diacrylate (HDDA), tripropyleneglycol diacrylate (TPGDA), and ethyleneglycol diacrylate (EGDA).

6. The hard coating film of claim 1, wherein the first and second photocurable crosslinked copolymers are the same or different from one another and independently a copolymer of the tri- to hexa-functional acrylate-based monomer and a photocurable elastic polymer.

7. The hard coating film of claim 6, wherein the photocurable elastic polymer has an elongation of 15 to 200%, as measured according to ASTM D638.

8. The hard coating film of claim 6, wherein the photocurable elastic polymer includes at least one selected from the group consisting of polycaprolactone, a urethane acrylate-based polymer, and polyrotaxane.

9. The hard coating film of claim 8, wherein the polyrotaxane includes: a macrocycle in which lactone compounds with a (meth)acrylate moiety conjugated to the end thereof are bonded to each other; a thread moiety held within the macrocycle; and stoppers provided at both ends of the thread moiety so as to prevent dissociation of the macrocycle.

10. The hard coating film of claim 1, wherein the supporting substrate includes at least one selected from the group consisting of polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), and methyl methacrylate (MMA).

11. The hard coating film of claim 1, wherein the first and second inorganic particles have a particle size of 100 nm or less.

12. The hard coating film of claim 1, wherein the first and second inorganic particles independently include at least one selected from the group consisting of silica nanoparticles, aluminum oxide nanoparticles, titanium oxide nanoparticles and zinc oxide nanopaticles.

13. The hard coating film of claim 1, further comprising: an additive dispersed in or crosslinked with each of the first and second photocurable crosslinked copolymers.

14. The hard coating film of claim 13, wherein the additive is dispersed in or crosslinked with each of the first and second photocurable crosslinked copolymers, and includes at least one selected from the group consisting of a fluorine-based acrylate having a mono- to di-functional fluorine-based acrylate, a fluorine-based surfactant, and a silicon-based surfactant.

15. The hard coating film of claim 13, wherein the additive is dispersed in or crosslinked with each of the first and second photocurable crosslinked copolymers, and includes a yellowing inhibitor including a benzophenone compound or a benzotriazole compound.

16. The hard coating film of claim 1, wherein the hard coating film has scratch resistance properties such that two or less scratches are formed when the surface of the hard coating film is rubbed by reciprocating a steel wool #0000 thereon 400 times under a load of 500 g.

17. The hard coating film of claim 1, wherein the hard coating film has a light transmittance of 91% or more, a haze of 0.4 or less and a b* value of 1.0 or less.

18. The hard coating film of claim 1, wherein the hard coating film has light resistance properties such that, when the hard coating film is exposed to UV-B for 72 hours, the change in b* value of the hard coating film is 0.5 or less.

19. The hard coating film of claim 1, wherein each of the first and second hard coating layers independently has a thickness of 50 to 150 µm.

20. The hard coating film of claim 1, wherein the hard coating film has curl resistance properties such that, when the hard coating film is exposed to a temperature of 50° C. or more and a humidity of 80% or more for 70 hours or more and then placed on a plane, a maximum distance at which each edge side of the hard coating film is spaced apart from the plane is 1.0 mm or less.

21. The hard coating film of claim 1, wherein a thickness ratio of the supporting substrate to each of the first and second hard coating layers is 1:0.5 to 1:2.

* * * * *